United States Patent
Dagdeviren

(10) Patent No.: US 7,292,648 B1
(45) Date of Patent: Nov. 6, 2007

(54) PRECODING FOR A NON-LINEAR CODEC

(75) Inventor: Nuri R Dagdeviren, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/540,475

(22) Filed: Mar. 31, 2000

Related U.S. Application Data

(60) Provisional application No. 60/169,896, filed on Dec. 9, 1999.

(51) Int. Cl.
    H04L 25/08    (2006.01)
(52) U.S. Cl. .................................... 375/296
(58) Field of Classification Search ................ 375/296, 375/353, 133, 135, 214, 216, 222, 233, 242, 375/241, 244, 261, 262, 265, 298, 340, 341, 375/346, 229, 232, 254, 285
See application file for complete search history.

(56) References Cited

U.S. PATENT DOCUMENTS

| | | | |
|---|---|---|---|
| 5,394,437 A | 2/1995 | Ayanoglu et al. | ........... 375/222 |
| 5,406,583 A | 4/1995 | Dagdeviren | .................... 375/5 |
| 5,528,625 A | 6/1996 | Ayanoglu et al. | ........... 375/222 |
| 5,602,583 A * | 2/1997 | Citta | ........................... 348/21 |
| 5,831,561 A | 11/1998 | Cai et al. | .................... 341/106 |
| 5,970,100 A * | 10/1999 | Olafsson et al. | ............ 375/296 |
| 6,061,407 A * | 5/2000 | Cherubini et al. | .......... 375/265 |
| 6,084,535 A | 7/2000 | Karabed et al. | |
| 6,198,776 B1 * | 3/2001 | Eyuboglu et al. | ........... 375/286 |
| 6,393,029 B1 * | 5/2002 | Turner et al. | ............... 370/419 |
| 6,798,851 B1 * | 9/2004 | Dagdeviren | ................. 375/340 |
| 2002/0118702 A1 * | 8/2002 | Turner et al. | ............... 370/466 |

FOREIGN PATENT DOCUMENTS

WO      WO99/50739      10/1999

OTHER PUBLICATIONS

PCM'00-018 "An adapted precoding method for channels with combined feedforward and feedback characteristics and applying this adapted precoder to V.92" Jan. 2000, Study Group 16-Q23.*
"The Capacity of PCM Voiceband Channels" by I. Kalet, J.E. Mazo and B.R Saltzberg, ICC '93 Geneva, vol. I Proceedings, pp. 507-511, Jul. 1993.
"An Equalizer Design Technique For The PCM Modem: A New Modem For The Digital Public Switched Telephone Network", E. Ayanoglu, N. Dagdeviren, G. Golden and J. Mazo, Bell Labs, Lucent Technologies, Holmdel, NJ (9 pages).
"New Automatic Equaliser Employing Modulo Arithmetic" by M. Tomlinson, Electronics Letters vol. 7, pp. 138-139, Mar. 1971.

(Continued)

*Primary Examiner*—Young T. Tse

(57) ABSTRACT

A precoding system to achieve rates higher than 33.6 kbps in the analog modem to digital modem direction. The preceding system modifies the standard THP algorithm to adapt it for use in PCM modems. Instead of an arithmetic modulo operation that is implemented in the transmitter, the invention defines a Discrete Modulo Operation as a function of the constellation of levels chosen. This operation performs the function of limiting the amplitude of the transmitted signal.

110 Claims, 4 Drawing Sheets

OTHER PUBLICATIONS

"Matched Transmission Technique for Channels with Intersymbol Interference" by H. Harashima and H. Miyakawa, IEEE Trans. Comm. vol. COMM-20, pp. 774-780, Aug. 1972.

"Pre-Equalization for Recommendation V.90—Issue 2" by Daeyoung Kim, 3Com, Conexant Systems, Motorola ING, Telecomm. Industry Assoc., Clearwater, FL, Nov. 1999, TR-30.1/99-11-054.

* cited by examiner

PRECODING FOR A NON-LINEAR CODEC

REFERENCE TO RELATED APPLICATIONS

This application claims the benefit of U.S. Provisional Application No. 60/169,896, filed Dec. 9, 1999.

FIELD OF THE INVENTION

This invention relates to analog modem technology. Specifically, it proposes a new precoding scheme to achieve higher rates in the analog modem to digital modem direction.

BACKGROUND OF THE INVENTION

FIG. 5 shows the basic elements of an end-to-end transmission within the Public Switched Telephone Network (hereinafter "PSTN"). The PSTN shown includes first and second Users, first and second Central Offices, and a Switched Digital Network. An Analog Subscriber Loop connects the Users to their respective Central Offices, and the Switched Digital Network connects the Central Offices together. The Analog Subscriber Loops are conventional twisted pairs that transport analog signals from the User Equipment to the associated local Central Office. At the Central Office, the analog signals are converted to 64 kbps DS0 digital data streams by a channel unit filter and codec, which together implement a bandlimiting filter followed by a nonlinear encoding rule and subsequent analog to digital conversion. The resulting DS0 streams are transported to their respective destination Central Office via the Switched Digital Network.

At the Central Office 1, User's 1 loop signal is first bandlimited. The bandlimited analog signal is then sampled at a rate of 8 ksamples/second, and then converted into an 8-bit digital representation using a nonlinear mapping rule referred to as PCM encoding. This encoding is approximately logarithmic, and its purpose is to permit relatively large dynamic range voice signals to be represented with only 8 bits per sample.

Users 1 and 2 may use a conventional modem, as shown in FIG. 6, to transmit digital data over the configuration of FIG. 5. The conventional modem encodes the user's digital data into a symbol sequence. The symbol sequence is then represented as an appropriately bandlimited analog signal which can be transmitted over the approximately 3.5 kHz bandwidth available on the end-to-end connection. The exemplary modem of FIG. 6 includes a Digital to Analog converter (i.e. D/A,) an Analog to Digital converter (i.e. A/D), and a hybrid. The A/D and the D/A perform PCM encoding. The non-linearity associated with the PCM coding is incorporated in the circuitry that converts the analog signals to digital signals, and vice-versa. That is, the analog voltage level of the received signal is mapped to the nearest PCM quantization level, and vice versa, so that the PCM quantization levels serve as the channel symbol alphabet.

PCM baseband modulation in the upstream direction, i.e. from User 1 to the Central Office, presents special equalization problems. For instance, one potential application for PCM baseband modulation in the upstream direction is in conjunction with "56k" modems. However, "56k" modems have a zero in the frequency band of interest. The zero at zero frequency comes from the transformer coupling of the analog subscriber loop to the central office equipment. Therefore, telephone lines do not pass DC signals. Low frequencies near DC are also attenuated significantly as to rule out linear equalization of this channel. Moreover, it is not possible to avoid the zero at DC for 56k modems using pass-band modulation as in the case of earlier V.34 modems because the central site modem is limited to using the sampling rate and quantization levels of the PCM codec at the central office.

One possible way to equalize this channel is to use a linear equalizer to reduce the channel response to a simpler "partial" response that still possesses the zero in the channel but can be dealt with using a non-linear technique such as maximum likelihood sequence (MLSE) decoding or decision feedback equalization (DFE). This however is only possible in the direction of digital modem to analog modem, also referred as the downstream direction. The reason this approach or any linear equalization scheme does not work in the upstream direction is that only PCM codec levels themselves can pass through the PCM codec unscathed. Any filtered version of a sequence of PCM levels will be a linear combination of these levels and in general not be a PCM level itself. When such intermediate levels are quantized by the PCM codec, quantization noise is introduced into the signal erasing any advantage over V.34 techniques.

Accordingly, there exists a need for a system capable of equalizing transmissions from an analog modem.

SUMMARY OF THE INVENTION

The present invention overcomes the above-described difficulties by precoding an upstream signal before transmission. In one aspect of the invention, the precoder comprises a feedback filter and a discrete modulo adder. The feedback filter generates a feedback signal as a function of a mapped constellation signal, and the discrete modulo adder generates the mapped constellation signal from the feedback signal and the input signal to the precoder. In addition, the discrete modulo adder utilizes an index to the constellation of levels chosen for the precoder such that the mapped constellation signal generated by the precoder has an amplitude that is limited.

In another aspect, the invention comprises a method of precoding an input signal to generate a mapped constellation signal. The method includes generating a feedback signal from the mapped constellation signal, and performing a discrete modulo operation on the feedback signal and the input signal. The discrete modulo operation is based upon an index to the constellation of levels chosen for the precoder, such that the amplitude of the mapped constellation signal is limited.

BRIEF DESCRIPTION OF THE DRAWINGS

The features and advantages of the invention will be apparent from the following description, as illustrated in the accompanying Figures in which like reference characters refer to the same elements throughout the different Figures.

DETAILED DESCRIPTION OF THE INVENTION

Figure 1:
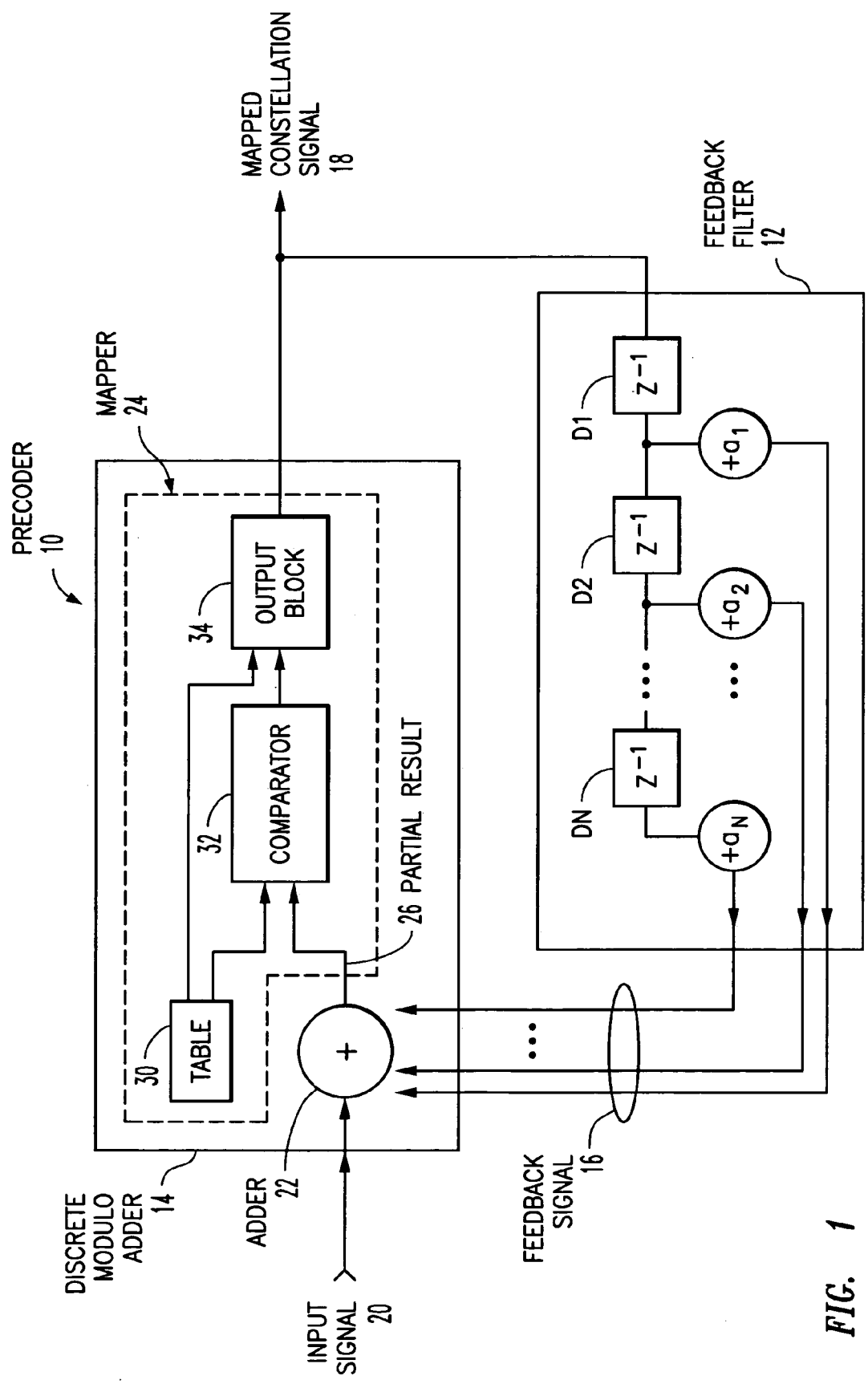
FIG. 1 is a block diagram of a precoder in accordance the present invention.

The inventor has recognized that one way to overcome the difficulties noted in the background of the invention is to use precoding in the transmitter, in place of MLSE or DFE in the receiver. In this way PCM levels can be used as the symbol constellation. The combination of the precoder and a linear equalizer will eliminate the inter-symbol interference (ISI) introduced by the channel. In this manner signals arriving at the PCM codec will be free of ISI and no quantization noise will be introduced.

The simplest manner of implementing preceding is to implement a feedback filter that equalizes the partial response. This however is not practical in the case where the channel and hence the partial response possesses a zero in the band of interest. The reason is that since the feedback filter equalizes the partial response, it has a very large gain at the frequency where the partial response has a zero. Components in the transmitted signal that correspond to this frequency will be greatly amplified leading to an unstable feedback loop.

Tomlinson Harashima Precoding ("THP") has emerged as an attractive solution for equalization in the presence of severe channel attenuation in the frequency band of interest; See M. Tomlinson "New Automatic Equalizer Employing Modulo Arithmetic" Electronics Letters Vol. 7, pp. 138-139, March 1971, the contents of which are incorporated herein by reference; and See H. Harashima and H. Miyakawa "Matched-Transmission Technique for Channels with Intersymbol Interference" IEEE Trans. Commun. Vol. COM-20, pp. 774-80, August 1972, the contents of which are incorporated herein by reference. THP is equivalent to Decision Feedback Equalization (DFE) in the receiver without the potential problem of error propagation.

The clever solution to the problem of very large gain at frequencies where the partial response has a zero is provided in the THP as follows. Whenever the output of the feedback loop passes a present threshold, the transmitted signal is subjected to a modulo operation which brings it back within range. This removes the instability in the feedback loop of the transmitter. The receiver must also account for the modulo operation in the transmitter. The receiver, since the modulo operation can be expressed as the addition of a constant, will compensate by subtracting the constant from the received signal. The receiver knows when to perform this compensation because whenever the transmitter subtracts the constant to bring the transmitted value to within range, the received value in the receiver will be out of range. When the receiver compensates the received signal by adding the constant, the received signal is brought back within range However, the standard THP scheme is not effective for PCM encoding in the upstream direction because the receiver can not implement the modulo compensation without introducing quantization noise. If the transmitter implements the standard THP modulo operation, then the received signal will arrive at the PCM codec with a value that corresponds to a PCM value shifted by a constant. In general it is not possible to find a set of PCM values and a constant such that each PCM value, when shifted by a constant is another PCM value. Thus THP scheme as previously defined is not effective for PCM modems.

This invention modifies the standard THP algorithm to adapt it for use in PCM modems. Instead of an arithmetic modulo operation that is implemented in the transmitter, the invention defines a Discrete Modulo Operation as a function of the constellation of levels chosen. The Discrete Modulo Operation is defined as a mapping from a constellation level outside the basic constellation of levels for the precoder to a constellation level inside the basic constellation of levels for the precoder. The mapping is based upon an index associated with levels in the constellation of levels. This operation performs the function of limiting the amplitude of the transmitted signals, hence removing the instability of the feedback loop, while ensuring that received signals at the PCM codec are always within the PCM level set free of quantization noise. Similarly, a discrete modulo operation is defined for the receiver to map received PCM values correctly into the symbol constellation.

Accordingly, FIG. 1 illustrates a block diagram of a precoder 10 in accordance with one aspect of the invention. The precoder 10 comprises a feedback filter 12 and a discrete modulo adder 14. The feedback filter 12 generates a feedback signal 16 as a function of a mapped constellation signal 18, and the discrete modulo adder 14 generates the mapped constellation signal 18 as a function of the feedback signal 16 and as a function of an input signal 20 to the precoder 10. The discrete modulo adder utilizes an index 31 (of FIG. 2) to the constellation of levels chosen for the precoder 10, such that the amplitude of the mapped constellation signal 18 is limited.

The discrete modulo adder 14 can also include an adder 22 and a mapper 24. The adder 22 sums together the feedback signal 16 and the input signal 20 to generate a partial result 26. The mapper 24 generates the mapped constellation signal 18 by mapping a partial result 26 outside a basic constellation of levels onto the basic constellation of levels.

As further illustrated in FIG. 1, the mapper 24 can include a table 30 that identifies both the levels inside a basic constellation of levels and those levels outside a basic constellation of levels. The table 30 further identifies the mapping from levels outside the basic constellation to the levels inside the basic constellation as a function of the index 31 associated with the levels in the table 30. Preferably, the levels outside the basic constellation are mapped onto only one level inside the basic constellation.

Figure 2:
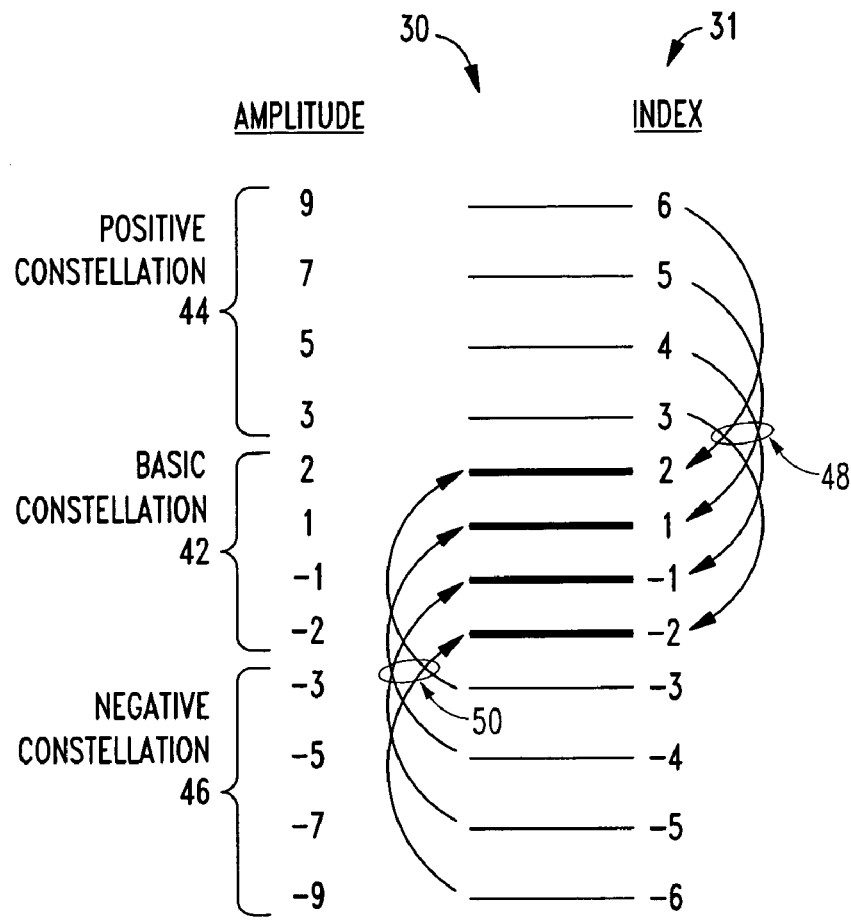
FIG. 2 is a graphical representation of an exemplary table utilized by the precoder of FIG. 1.

FIG. 2 illustrates a graphical representation of an exemplary table 30 utilized by the precoder 10 of FIG. 1. The exemplary table 30 has a total of 12 levels, each level being identified by a horizontal line. The table 30 also includes two columns, one labeled Amplitude and another labeled Index 31. The Amplitude column has 12 entries, one for each level. The Index column also has 12 entries, one for each column. Thus, as shown in FIG. 2, amplitude 9 and index 6 are both associated with the first level; amplitude 7 and index 5 are both associated with the second level; amplitude 5 and index 4 are both associated with the third level; . . . and amplitude −9 and index −6 are both associated with the twelfth level.

The levels in the exemplary table 30 can also be subdivided into three separate constellations: a basic constellation 42, a positive constellation 44, and a negative constellation 46. The basic constellation 42 extends into both the positive and negative directions from an amplitude level of zero. Typically, the basic constellation extends an equal distance from amplitude zero into both the positive and negative directions. The positive constellation 44 extends from the maximum level of the basic constellation upwards, and the negative constellation 46 extends from the minimum level of the basic constellation downwards. For example, as shown in FIG. 2, the basic constellation includes the amplitudes {2, 1, −1, −2}, or alternatively the basic constellation includes the indexes {2, 1, −1, −2}. The positive constellation includes the amplitudes {3, 5, 7, 9} or the indexes {3, 4, 5, 6}. The negative constellation includes the amplitudes {−3, −5, −7, −9} or the indexes {−3, −4, −5, −6}. In a preferred embodiment of the invention, the basic constellation includes a set of indexes extending from −k to k; the positive constellation includes a set of indexes extending from k+1 to 3k; and the negative constellation includes a set of indexes extending from −k−1 to −3k.

The amplitude entries show that the separation between levels in the table may vary, as is found in PCM codec levels. For instance, the separation between levels in the basic constellation 42 of FIG. 2 equals one amplitude, while the separation between levels in the positive constellation 44 equals two amplitudes. In comparison, in a preferred embodiment of the invention, the separation between indexes is a constant, regardless of the constellation. As shown in FIG. 1, the index separation between successive levels always equals one. Accordingly, although the difference in amplitude between the successive levels shown in FIG. 2 may vary, the difference in index between successive levels is a constant.

The exemplary table 30 of FIG. 2 also uses a first set of arrows 48 to show a mapping from levels in the positive constellation 44 to levels in the basic constellation 42. A second set of arrows 50 shows a mapping from levels in the negative constellation 46 to levels in the basic constellation 42. The first set of arrows 48 identifies that the levels associated with indexes {3, 4, 5, 6} in the positive constellation are mapped to the levels associated with indexes {−2, −1, 1, 2} in the basic constellation, respectively. The second set of arrows 50 identifies that the levels associated with indexes {−3, −4, −5, −6} in the negative constellation are mapped to the levels associated with indexes {2, 1, −1, −2} in the basic constellation, respectively. Thus, there is a one-to-one mapping between levels in the positive constellation 44 and the basic constellation 42, and there is another one-to-one mapping between levels in the negative constellation 46 and the basic constellation 42.

In a preferred embodiment of the invention, each of the levels in the positive constellation are mapped onto levels in the basic constellation based on the indexing system chosen. This form of mapping between the basic constellation and those levels outside the basic constellation, based upon the indexes in the constellation, will be referred to as a discrete modulo operation. Preferably, the discrete modulo operation is defined as a shift operation between the indexes in the basic constellation and the indexes outside the basic constellation (i.e. the positive constellation 44 and the negative constellation 46).

An exemplary shift operation is as follows:
if the indexes in the basic constellation are labeled, basic_const, where basic_const goes from −k to k, and
if the indexes in the positive constellation are labeled positive_const, where positive_const goes from k+1 to m,
then the levels in the positive constellation 44 are mapped onto levels in the basic constellation 42 according to the equations:

Index positive_const→positive_const−(2*k); while positive_const>m−k; and

Index positive_const→positive_const−(2*k)−1; while positive_const<=m−k;

Wherein → identifies the mapping function.

For example, the basic constellation might include the indexes {−2, −1, 1, 2} and the positive constellation might includes the indexes {3, 4, 5, 6}. Given this set of constellations, the mapping is calculated as follows:

index 6 maps to 6−(2*k)=6−4=2;

index 5 maps to 5−(2*k)=5−4=1;

index 4 maps to 4−(2*k)−1=4−4−1=−1; and index 3 maps to 3−(2*k)−1=3−4−1=−2.

In an analogous fashion, the indexes in the negative constellation can be mapped onto levels in the basic constellation:
if the indexes in the basic constellation are labeled, basic_const, where basic_const goes from −k to k, and
if the indexes in the negative constellation are labeled negative_const, where negative_const goes from −k−1 to −m,
then the levels in the negative constellation 46 are mapped onto levels in the basic constellation 42 according to the equations:

Index negative_const→negative_const+(2*k); while negative_const<−(m−k); and

Index negative_const→negative_const+(2*k)+1; while negative_const>=−(m−k);

Wherein → identifies the mapping function.

This discrete modulo operation performs the function of limiting the amplitude of signals by mapping signals in the table outside the basic constellation onto signals inside the basic constellation. This mapping function allows the precoder 10 to remove the potential instability caused by the feedback filter 12. This completes the description of the basic elements of table 30, as shown in FIGS. 1 and 2.

With further reference to FIG. 1, the mapper 24 can also include a comparator 32 and an output block 34. The comparator 32 compares the partial result 26 with levels in the table 30. For instance, the comparator can identify the level in table 30 closest to the partial result 26.

The output block 34 generates the mapped constellation signal 18. The mapped constellation signal 18 is selected from the levels in the basic constellation even though the partial result may be a level outside the basic constellation. In particular, the mapped constellation signal 18 output by the block 34 is equal to the identified level closest to the partial result 26 if the identified level is inside the basic constellation. Alternatively, if the identified level is outside the basic constellation, then the mapped constellation signal 18 is set equal to the sum of the partial result and a mapping distance signal. The mapping distance signal equals the distance between the index basic_const, associated with the basic constellation level of the input signal, and the index positive_const, associated with a level outside the basic constellation. Further details on determining the mapping distance are discussed under the description of FIG. 4.

FIG. 1 also illustrates details of the feedback filter 12. The feedback filter can include one or more delay elements D1, D2, . . . , DN, and the feedback filter can include one or more weighting elements a1, a2, . . . , aN. The feedback filter 12 thus provides feedback connections whose weighting coefficients are a1, a2, . . . , aN. The feedback filter 12 can be used to model an impulse response of a communication channel over which the input signal 20 is transmitted.

Figure 3:
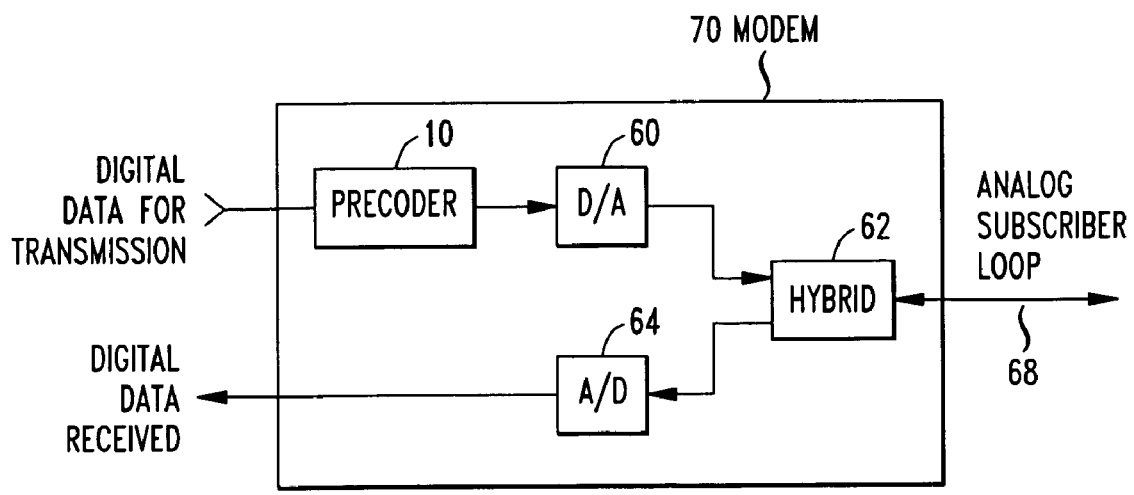
FIG. 3 is a block diagram illustrating the precoder of FIG. 1 in a modem.

FIG. 3 is a block diagram illustrating the precoder 10 of FIG. 1 in a modem 70. The modem 70 includes the precoder 10, a digital to analog converter 60 ("D/A"), a hybrid 62, and an analog to digital converter 64 ("A/D"). An analog subscriber loop 68 operably couples the modem 70 to a PSTN.

The hybrid 62 operably couples the modem 70 to the analog local loop 68. A hybrid can generally be described as a passive device used for converting a dual analog signal that is carried on one pair of conductors (i.e. the analog local loop) to separate analog signals that are carried on two pairs of conductors. Those skilled in the art are familiar with the use and operation of hybrid devices and, thus, a detailed description thereof is not necessary to enable one of skill in the art to make and practice the present invention The D/A converts digital signals to analog signals for transmission over the analog local loop, and the A/D converts analog signal received from the analog local loop to digital signals. The A/D converter and the D/A converter can also be described as capable of implementing a CODEC (coder/decoder) function. In one embodiment of the invention, the A/D implements a mu-law CODEC. Those skilled in the art are familiar with the non-linear mu-law and A-law signal compression algorithms. The mu-law algorithm includes 255 discrete signal conversion values; A-law uses 256 values. The broad principles of the invention are not, however, limited to a specific quantization scheme.

For instance, the A/D converter can utilize 255 non-uniformly spaced quantization levels, which are closer together for small analog signal values and spread further apart for large signal values, to convert an analog signal received from the analog local loop to one of 255 unique "symbols" or "levels". A DSP in the modem then uses a symbol table to convert the received symbol back to the data transmitted by the Central Office over the analog subscriber loop.

Figure 4:
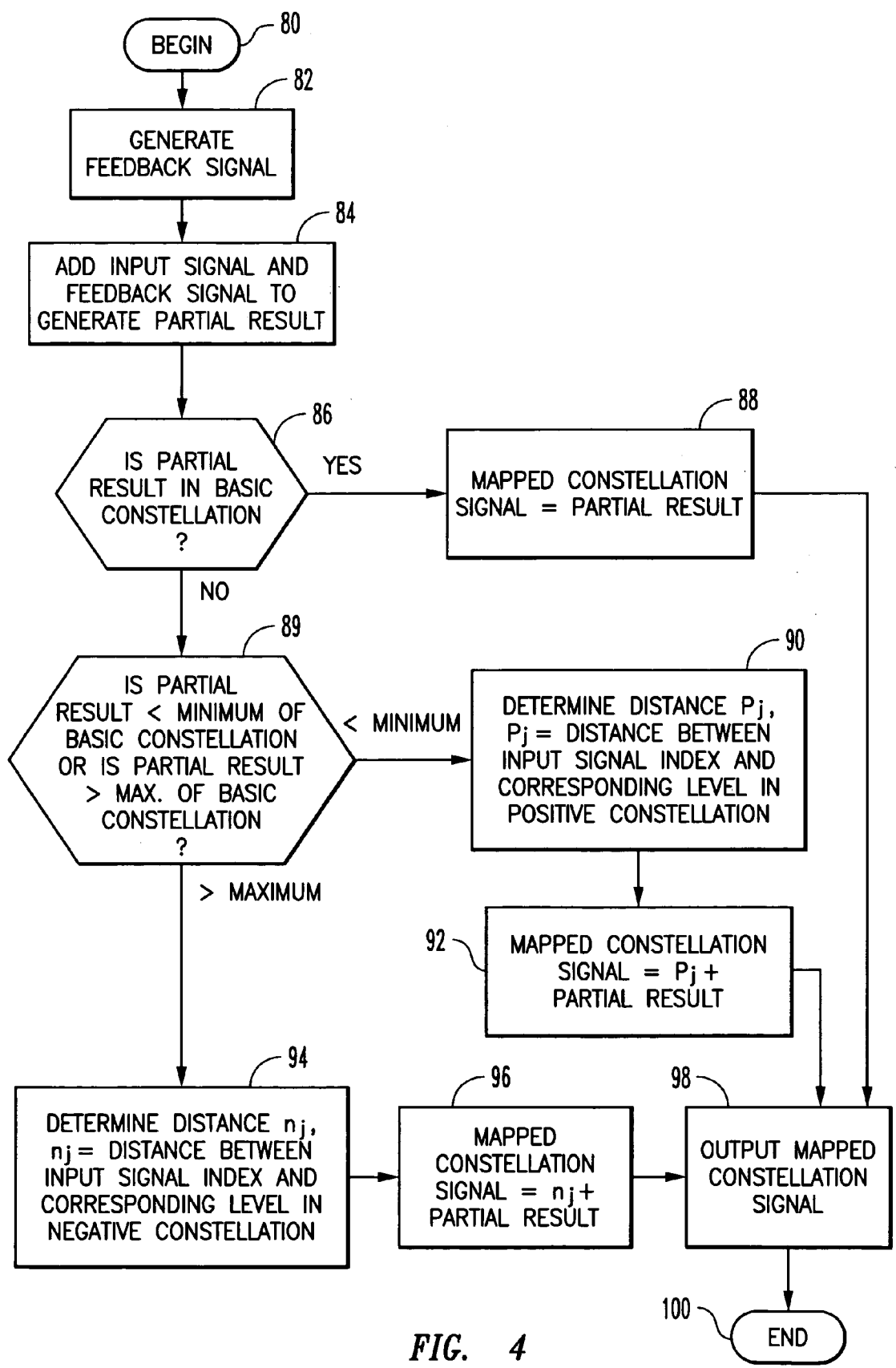
FIG. 4 is a flow chart illustrating the precoding method in accordance with the present invention.
Figure 5:
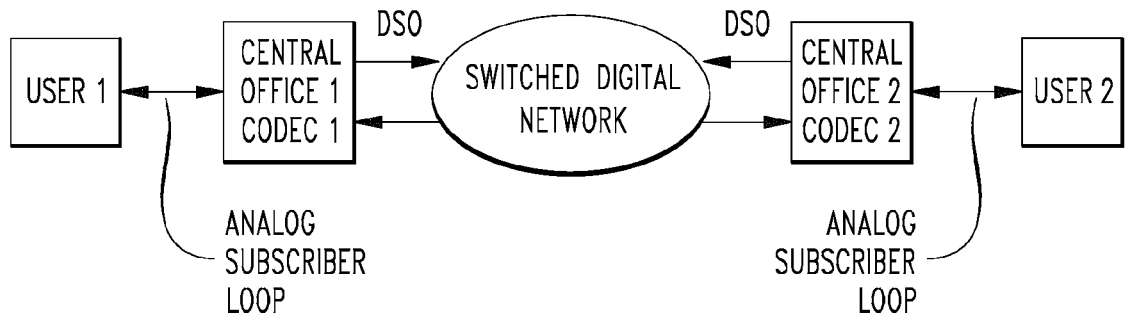
FIG. 5 is a block diagram of a conventional Public Switched Telephone Network.
Figure 6:
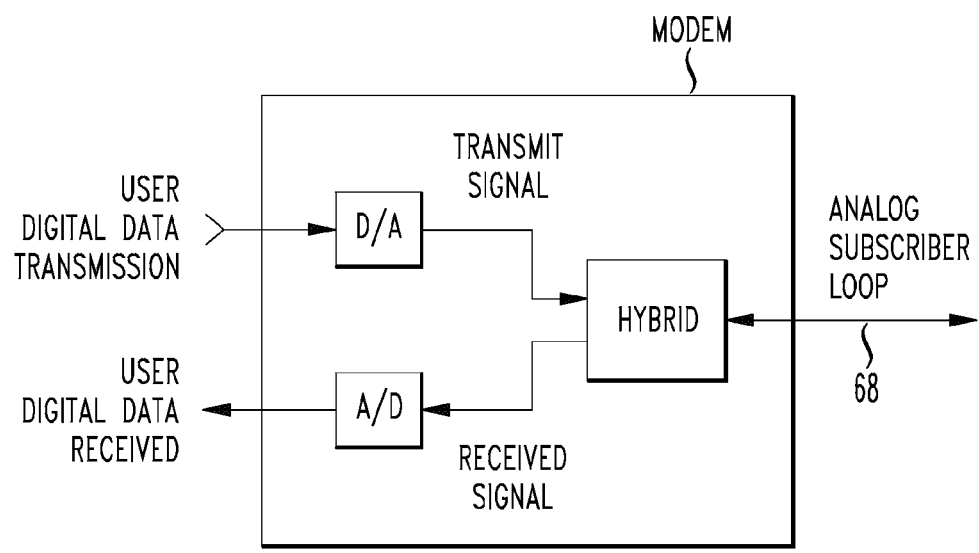
FIG. 6 is a block diagram of a conventional modem.

FIG. 4 is a flow chart illustrating the method of precoding an input signal to generate a mapped constellation signal, in accordance with the present invention. The method includes generating a feedback signal from the mapped constellation signal at step 82, and performing a discrete modulo operation on the feedback signal and the input signal at steps 86-100. The discrete modulo operation is based upon an index to the constellation of levels chosen for the precoder, such that the amplitude of the mapped constellation signal is limited.

FIG. 4, also shows that the discrete modulo operation can include the steps of adding together the input signal and the feedback signal to generate a partial result at step 84, determining whether the generated partial result is contained within a basic constellation of levels at step 86, and generating the mapped constellation signal by mapping a partial result outside the basic constellation of levels onto a level inside the basic constellation of levels as a function of the index to the levels, at steps 89-100.

In particular, at step 86 the method determines whether the partial result calculated in step 84 is in the basic constellation 42. This can be implemented by comparing the partial result to entries in the table 30. If the partial result is in the basic constellation 42, then processing proceeds to step 88, otherwise processing proceeds to step 89.

At step 88, the mapped constellation signal is set equal to the partial result 88. For instance, if the partial result is in the basic constellation, then feedback has not caused the partial result to be out of range and accordingly no mapping is required. After step 88, processing proceeds to step 98.

At step 89, the method determines whether the partial result is less than the minimum of the basic constellation or whether the partial result is greater than the maximum of the basic constellation. If the partial result is less than the minimum of the basic constellation, then the method branches to step 90. If the partial result is greater than the maximum of the basic constellation, then the method branches to step 94.

At step 90, the method determines the mapping distance $p_j$. The mapping distance $p_j$=the distance between an index basic_const and the index positive_const. The index basic_const is the index associated with the basic constellation level of the input signal, and the index positive_const is an index associated with a level found in the positive constellation 44 of FIG. 2. In particular, the index positive_const is the index in the positive constellation 44 that maps onto the basic constellation level of the input signal. The index positive_const can be obtained from the table 30. After step 90, processing proceeds to step 92.

At step 92, the mapped constellation signal is set equal to the sum of the mapping distance $p_j$ and the partial result. After step 92, processing proceeds to step 98.

At step 94, which is reached from step 89, the method determines the mapping distance $n_j$. The mapping distance $n_j$=the distance between an index basic_const and an index negative_const. The index basic_const is the index associated with the basic constellation level of the input signal, and the index negative_const is an index associated with a level found in the negative constellation 46 of FIG. 2. In particular, the index negative_const is the index in the negative constellation 46 that maps onto the basic constellation level of the input signal. The index negative_const can be obtained from the table 30. After step 94, processing proceeds to step 96.

At step 96, the mapped constellation signal is set equal to the sum of the mapping distance $n_j$ and the partial result. After step 96, processing proceeds to step 98.

At step 98, the precoder 10 outputs the mapped constellation signal 18. At step 100, the method ends.

Exemplary Operation of the Precoding Method:

A) Let's say the desired sequence to be transmitted is:

$$2, -2, -2, 2, 1, -1, -2, 2$$

B) Let's also assume that our feedback filter coefficients are 1 and −1 so what is to be transmitted is the current input signal minus the previously transmitted sample, then C) With the first input signal=2, then the first output of the adder 22 (i.e. the partial result signal 26) is:

$$2-0=2$$

which is in range so it is transmitted as 2.

D) With the second input signal=−2, then the second output of the adder 22 (i.e. the partial result signal 26) is:

$$-2-2=-4$$

This value is out of range of the basic constellation 42, so it must undergo the discrete modulo operation outlined in steps 89-96 of FIG. 4. Using the table shown in FIG. 2, we can identify that when the input signal=−2 the corresponding index in the positive constellation 44 is 3. Thus:

$p_j$=difference between the index of the input signal and the index associated with a level in the positive constellation that maps onto the basic constellation level of the input signal, and accordingly $$p_j = \text{absolute value of } [(-2)-(3)]=5.$$

Then, in accordance with step 92, the mapped constellation signal=$p_j$+partial result=5+(−4)=1.

So the second transmitted value is 1.

E) With the third input signal=−2, then the first output of the adder 22 (i.e. the partial result signal 26) is:

$$-2-1=-3.$$

This value is out of range of the basic constellation 42, so it must undergo the discrete modulo operation outlined in steps 89-96 of FIG. 4. Using the table shown in FIG. 2, we can identify that when the input signal=−2 the corresponding index in the positive constellation 44 is 3. Thus:

$p_j$=difference between the index of the input signal and the index associated with a level in the positive constellation that maps onto the basic constellation level of the input signal, and accordingly $p_j$=absolute value of [(−2)−(3)]=5.

Then, in accordance with step 92, the mapped constellation signal=$p_j$+partial result=5+(−3)=2.

So the second transmitted value is 2.

E) The fourth input signal is 2, and the output of the adder 22 (i.e. the partial result signal 26) is:

2−2=0 which is in range so it is transmitted as 0.

F) The fifth input signal is 1, and the output of the adder 22 (i.e. the partial result signal 26) is:

1−0=1 which is in range so it is transmitted as 1.

G) The sixth input signal is −1, and the output of the adder 22 is:

−1−1=−2 which is in range so it is transmitted as −2.

Whenever a receiver in a digital modem receives a level in the positive or negative constellations, it maps the level to the corresponding level in the basic constellation as identified in the table 30. This mapping in the receiver can be formulated as a shift operation that is dependent on the level being transmitted. If the difference between the level in the basic constellation and the corresponding level in the negative constellation is $n_j$, then the mapping in the receiver from the negative constellation can be thought of as an addition of offset $n_j$ to the received value. Thus, if we completed the above example by showing the response in the receiver, we get the following:

| | |
|---|---|
| Transmitted Symbol Sequence | . . . 2, −2, −2, 2, 1, −1 . . . |
| Partial Result | . . . 2, −4, −3, 0, 1, 2 . . . |
| What is xmitted | . . . 2, 1, 2, 0, 1, −2 . . . |
| Output of comm. Channel (i.e. what is received) | . . . 2, 3, 3, 2, 1, −1 |
| After Receiver mapping to basic constellation | . . . 2, −2, −2, 2, 1, −1 |

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and is not limiting.

What is claimed is:

1. A precoder for generating a mapped constellation signal, from an input signal, comprising:

a feedback filter, based upon a model of an impulse response of a communication channel, that generates a feedback signal as a function of the mapped constellation signal, and a processing element that generates the mapped constellation signal from the input signal and the feedback signal, the processing element utilizing an index to a constellation of levels chosen for the precoder, wherein the constellation of levels includes a basic constellation of levels and a set of levels outside the basic constellation of levels, such that the amplitude of the mapped constellation signal is limited.

2. The precoder according to claim 1, wherein the processing element comprises:

an adder that adds together the feedback signal and the input signal to generate a partial result, and a mapper that generates the mapped constellation signal by mapping the partial result outside the basic constellation of levels onto the basic constellation of levels as a function of the index to the constellation of levels for the precoder.

3. The precoder according to claim 2, wherein the mapper comprises:

a table identifying the basic constellation of levels and a mapping from the set of levels outside the basic constellation of levels to levels inside the basic constellation of levels.

4. The precoder according to claim 2, wherein the mapper comprises:

a table having a constellation index basic_const, where the basic_const goes from −k to k, associated with each of a plurality of levels inside the basic constellation of levels, and having a constellation index positive_const, where the positive_const goes from k+1 to m, associated with a plurality of levels outside the basic constellation of levels, wherein said k is a constant and said m is a multiple of said k.

5. The precoder according to claim 4, wherein each index of the plurality of levels outside the basic constellation of levels is mapped onto a level inside the basic constellation of levels according to the equation:

index positive_const→positive_const−(2*k); while positive_const>m−k; and index positive_const→positive_const−(2*k)−1; while positive_const<=m−k;

wherein→identifies a mapping function.

6. The precoder according to claim 4, wherein the mapper further comprises a comparator for comparing the partial result with the levels in the table.

7. The precoder according to claim 6, wherein the comparator identifies the level closest to the partial result.

8. The precoder according to claim 7, wherein the mapper further includes an output block that generates the mapped constellation signal equal to a level inside the basic constellation of levels, if the identified level in the table closest to the partial result is inside the basic constellation of levels.

9. The precoder according to claim 8, wherein the mapped constellation signal is set equal to the sum of the partial result and a mapping distance signal, wherein the mapping distance signal equals the distance between the index basic_const, associated with the basic constellation level of the input signal, and the index positive_const, associated with a level outside the basic constellation of levels.

10. The precoder according to claim 2, wherein the mapper comprises:

a table having a constellation index basic_const, where the basic_const goes from −k to k, associated with each of a plurality of levels inside the basic constellation of levels, and having a constellation index negative_const, where the negative_const goes from −k−1 to −m, associated with a plurality of levels outside the basic constellation of levels.

11. The precoder according to claim 10, wherein each index of plurality of levels outside the basic constellation of levels is mapped onto a level inside the basic constellation of levels according to the equation:

index negative_const→negative_const+(2*k); while negative_const<−(m−k); and index negative_const→negative_const+(2*k)+1; while negative_const>=−(m−k);

wherein→identifies a mapping function.

12. The precoder according to claim 1, wherein the feedback filter includes a delay element and a weighting element such that the feedback filter multiplies a delayed version of the mapped constellation signal by the weighting element to generate the feedback signal.

13. The precoder according to claim 1, wherein each of the set of levels outside the basic constellation of levels is mapped onto only one level inside the basic constellation of levels.

14. The precoder according to claim 1, further comprising a digital to analog converter that generates an analog output signal based upon the mapped constellation signal.

15. The precoder according to claim 14, further comprising a hybrid for operably coupling the digital to analog converter to an analog subscriber loop.

16. The precoder according to claim 1, wherein successive levels in the basic constellation of levels are separated by a distance D1, and wherein a plurality of successive levels outside the basic constellation of levels is separated by a distance D2 such that D1 differs from D2.

17. The precoder according to claim 1 wherein the amplitude of the mapped constellation signal is limited to the basic constellation of levels.

18. The precoder according to claim 1 wherein a plurality of index values is associated, respectively, with a plurality of amplitude levels in the constellation of levels.

19. A precoder for an analog modem, the precoder comprising:
    a processing element that generates a mapped constellation signal as a function of a feedback signal and an input signal to the precoder, the processing element including:
    an adder that adds together the feedback signal and the input signal to generate a partial result,
    a table identifying a basic constellation of levels and levels outside the basic constellation of levels, wherein the levels outside the basic constellation of levels are mapped onto levels inside the basic constellation of levels as a function of an index associated with each level in the table,
    an output block that generates the mapped constellation signal equal to a level inside the basic constellation of levels by mapping a partial result outside the basic constellation of levels onto a level inside the basic constellation of levels, and
    a feedback filter that generates the feedback signal as a function of the mapped constellation signal output by the processing element.

20. The precoder according to claim 19, wherein each of the levels outside the basic constellation of levels in the table is mapped onto only one level inside the basic constellation of levels in the table.

21. The precoder according to claim 19, further comprising:
    the table having a constellation index basic_const, where the basic_const goes from −k to k, associated with each of a plurality of levels inside the basic constellation of levels, and having a constellation index positive_const, where the positive_const goes from k+1 to m, associated with a plurality of levels outside the basic constellation of levels.

22. The precoder according to claim 21, wherein each index of the plurality of levels outside the basic constellation of levels is mapped onto a level inside the basic constellation of levels according to the equation:

index positive_const→positive_const−(2*k); while positive_const>m−k; and index positive_const→positive_const−(2*k)−1; while positive_const<=m−k;

wherein→identifies a mapping function.

23. The precoder according to claim 21, wherein the mapped constellation signal is set equal to the sum of the partial result and a mapping distance signal, wherein the mapping distance signal equals the distance between the index basic_const, associated with the basic constellation level of the input signal, and the index positive_const, associated with a level outside the basic constellation of levels.

24. The precoder according to claim 19, further comprising:
    the table having a constellation index basic_const, where the basic_const goes from −k to k, associated with each of a plurality of levels inside the basic constellation of levels, and having a constellation index negative_const, where the negative_const goes from −k−1 to −m, associated with a plurality of levels outside the basic constellation of levels.

25. The precoder according to claim 24, wherein each index of the plurality of levels outside the basic constellation of levels is mapped onto a level inside the basic constellation of levels according to the equation:

index negative_const→negative_const+(2*k); while negative_const<−(m−k); and index negative_const→negative_const+(2*k)+1; while negative_const>=−(m−k);

wherein→identifies a mapping function.

26. The precoder according to claim 19 wherein a first distance between successive levels in the basic constellation of levels differs from a second distance between successive levels outside the basic constellation of levels.

27. A method of preceding an input signal to generate a mapped constellation signal, comprising:
    generating a feedback signal from the mapped constellation signal by multiplying a delayed version of the mapped constellation signal by a weighting element, and
    performing an operation on the feedback signal and the input signal based upon an index to a constellation of levels chosen for a precoder, wherein the constellation of levels includes a basic constellation of levels and a set of levels outside the basic constellation of levels, such that an amplitude of the mapped constellation signal is limited.

28. The method of precoding according to claim 27, wherein the step of performing the operation includes:
adding together the input signal and the feedback signal to generate a partial result,
determining whether the generated partial result is contained within the basic constellation of levels, and
generating the mapped constellation signal by mapping a partial result outside the basic constellation of levels onto a level inside the basic constellation of levels as a function of the index to the constellation of levels for the precoder.

29. The method according to claim 28, wherein the determining step includes comparing the generated partial result with a table identifying the basic constellation of levels and a plurality of levels outside the basic constellation of levels.

30. The method according to claim 29, wherein the generated mapped constellation signal equals to the partial result if the partial result is inside the basic constellation of levels.

31. The method according to claim 29, further including the step of determining whether the partial result is less than a minimum level of the basic constellation of levels or whether the partial result is greater than a maximum level of the basic constellation of levels.

32. The method according to claim 31, further including a step of determining a mapping distance $p_j$ when the partial result is less than the minimum level of the basic constellation of levels, the mapping distance $p_j$ being equal to a distance between an index basic_const, associated with a basic constellation level of the input signal, and an index positive_const, associated with a level outside the basic constellation of levels, wherein j represents said basic constellation level of the input signal and said level outside the basic constellation of levels.

33. The method according to claim 32, wherein the index positive_const is an index to a level that maps onto the basic constellation level of the input signal, and wherein the index positive_const is an index to a level in a positive constellation of levels that includes those levels greater than the maximum level in the basic constellation of levels.

34. The method according to claim 33, further including a step of obtaining the index positive_const from the table.

35. The method according to claim 32, further including a step of generating the mapped constellation signal by adding together the partial result and the mapping distance $p_j$.

36. The method according to claim 31, further including a step of determining a mapping distance $n_j$, when the partial result is greater than the maximum level of the basic constellation of levels, the mapping distance $n_j$ being equal to a distance between an index basic_const, associated with a basic constellation level of the input signal, and an index negative_const, associated with a level outside the basic constellation of levels, wherein j represents said basic constellation level of the input signal and said level outside the basic constellation of levels.

37. The method according to claim 36, wherein the index negative_const is an index to a level that maps onto the basic constellation level of the input signal, and wherein the index negative_const is an index to a level in a negative constellation of levels that includes those levels less than the minimum level in the basic constellation of levels.

38. The method according to claim 37, further including the step of obtaining the index negative_const from the table.

39. The method according to claim 36, further including the step of generating the mapped constellation signal by adding together the partial result and the mapping distance $n_j$.

40. The method according to claim 27 wherein the step of performing includes limiting the amplitude of the mapped constellation signal by the basic constellation of levels.

41. The method according to claim 27 wherein a first distance between successive levels in the basic constellation of levels differs from a second distance between successive levels outside the basic constellation of levels.

42. The method according to claim 27 wherein the step of performing includes mapping each level outside the basic constellation of levels onto only one level inside the basic constellation of levels.

43. The method of preceding according to claim 27 wherein a plurality of index values is associated, respectively, with a plurality of amplitude levels in the constellation of levels.

44. A computer-readable medium having stored thereon a plurality of instructions, the plurality of instructions including instructions that when executed by a processor cause the processor to implement a method of precoding an input signal to generate a mapped constellation signal, the method comprising:
generating a feedback signal from the mapped constellation signal, and
performing an operation on the feedback signal and the input signal based upon an index to a constellation of levels chosen for a precoder, wherein the constellation of levels includes a basic constellation of levels and a set of levels outside the basic constellation of levels, such that an amplitude of the mapped constellation signal is limited, the performing including:
adding together the input signal and the feedback signal to generate a partial result,
determining whether the generated partial result is contained within the basic constellation of levels, and
generating the mapped constellation signal by mapping a partial result outside the basic constellation of levels onto a level inside the basic constellation of levels.

45. The computer-readable medium of claim 44 wherein the amplitude of the mapped constellation signal is limited to the basic constellation of levels.

46. The computer-readable medium of claim 44 wherein a first distance between successive levels in the basic constellation of levels differs from a second distance between successive levels outside the basic constellation of levels.

47. The computer-readable medium of claim 44 wherein the step of performing includes mapping each level outside the basic constellation of levels onto only one level inside the basic constellation of levels.

48. The computer-readable medium of claim 44 wherein a plurality of index values is associated, respectively, with a plurality of amplitude levels in the constellation of levels.

49. An apparatus for generating a mapped constellation signal from an input signal, comprising:
a precoder configured to generate the mapped constellation signal from the input signal and a feedback signal using a constellation of levels that includes a basic constellation of levels having successive levels that are separated by a distance D1 and a set of levels outside the basic constellation of levels wherein a plurality of successive levels outside the basic constellation of levels is separated by a distance D2 such that D1 differs from D2, and wherein the precoder is configured to associate an index with each of the levels in the constellation of levels such that the levels outside the basic constellation of levels are associated with the levels inside the basic constellation of levels.

50. The apparatus according to claim 49 further including a feedback filter having a delay element and a weighting element such that the feedback filter multiplies a delayed version of the mapped constellation signal by the weighting element to generate the feedback signal.

51. The apparatus according to claim 49 further including a feedback filter coupled to said precoder and based upon a model of an impulse response of a communication channel.

52. The apparatus according to claim 49 wherein the precoder employs an adder that adds together the feedback signal and the input signal to generate a partial result and a mapper that generates the mapped constellation signal by mapping a partial result outside the basic constellation of levels onto the basic constellation of levels as a function of the index to the constellation of levels, the mapper having a table to identify the basic constellation of levels and associate levels outside the basic constellation of levels to levels inside the basic constellation of levels.

53. The apparatus according to claim 52 wherein the precoder includes a table that identifies the basic constellation of levels, wherein the table has a constellation index basic_const, where the basic_const goes from $-k$ to $k$, associated with each of a plurality of levels inside the basic constellation of levels, and wherein the table has a constellation index positive_const, where the positive_const goes from $k+1$ to $m$, associated with a plurality of levels outside the basic constellation of levels, wherein said k is a constant and said m is a multiple of said k.

54. The apparatus according to claim 53 wherein the precoder maps each of the plurality of levels outside the basic constellation of levels onto a level inside the basic constellation of levels according to the equation:

index positive_const→positive_const−(2*k); while positive_const>m−k; and index positive_const→positive_const−(2*k)−1; while positive_const<=m−k;

wherein→identifies a mapping function.

55. The apparatus according to claim 54, wherein the mapped constellation signal is set equal to the sum of the partial result and a mapping distance signal, wherein the mapping distance signal equals the distance between the index basic_const, associated with a basic constellation level of the input signal, and the index positive_const, associated with a level outside the basic constellation of levels.

56. The apparatus according to claim 52 wherein the mapper further comprises a comparator for comparing the partial result with the levels in the table.

57. The apparatus according to claim 56 wherein the comparator identifies the level closest to the partial result.

58. The apparatus according to claim 57 wherein the mapper further includes an output block that generates the mapped constellation signal equal to a level inside the basic constellation of levels, if the identified level in the table closest to the partial result is inside the basic constellation of levels.

59. The apparatus according to claim 49 wherein each of the levels outside the basic constellation of levels is only associated with one level inside the basic constellation of levels.

60. The apparatus according to claim 49 wherein the precoder includes a table that identifies the basic constellation of levels, wherein the table has a constellation index basic_const, where the basic_const goes from $-k$ to $k$, associated with each of a plurality of levels inside the basic constellation of levels, and wherein the table has a constellation index negative_const, where the negative_const goes from $-k-1$ to $-m$, associated with a plurality of levels outside the basic constellation of levels, wherein said k is a constant and said m is a multiple of said k.

61. The apparatus according to claim 60 wherein the precoder maps each of the plurality of levels outside the basic constellation of levels onto a level inside the basic constellation of levels according to the equation:

index negative_const→negative_const+(2*k); while negative_const<−(m−k); and index negative_const→negative_const+(2*k)+1; while negative_const>=−(m−k);

wherein→identifies a mapping function.

62. The apparatus according to claim 49 wherein a plurality of index values is associated, respectively, with a plurality of amplitude levels in the constellation of levels.

63. A precoder for generating a mapped constellation signal, from an input signal, comprising:
a feedback filter, including a delay element and a weighting element, that generates a feedback signal as a function of the mapped constellation signal by multiplying a delayed version of the mapped constellation signal by the weighting element, and
a processing element that generates the mapped constellation signal from the input signal and the feedback signal, the processing element utilizing an index to a constellation of levels chosen for the precoder, wherein the constellation of levels includes a basic constellation of levels and a set of levels outside the basic constellation of levels, such that the amplitude of the mapped constellation signal is limited.

64. The precoder according to claim 63, wherein the processing element comprises:
an adder that adds together the feedback signal and the input signal to generate a partial result, and
a mapper that generates the mapped constellation signal by mapping a partial result outside the basic constellation of levels onto the basic constellation of levels as a function of the index to the constellation of levels for the precoder.

65. The precoder according to claim 64, wherein the mapper comprises:
a table identifying the basic constellation of levels and a mapping from the set of levels outside the basic constellation of levels to levels inside the basic constellation of levels.

66. The precoder according to claim 64, wherein the mapper comprises:
a table having a constellation index basic_const, where the basic_const goes from $-k$ to $k$, associated with each of a plurality of levels inside the basic constellation of levels, and having a constellation index positive_const, where the positive_const goes from $k+1$ to $m$, associated with a plurality of levels outside the basic constellation of levels.

67. The precoder according to claim 66, wherein the mapper further comprises a comparator for comparing the partial result with the levels in the table.

68. The precoder according to claim 67, wherein the comparator identifies the level closest to the partial result.

69. The precoder according to claim 68, wherein the mapper further includes an output block that generates the mapped constellation signal equal to a level inside the basic constellation of levels, if the identified level in the table closest to the partial result is inside the basic constellation of levels.

70. The precoder according to claim 64, wherein the mapper comprises:
a table having a constellation index basic_const, where the basic_const goes from −k to k, associated with each of a plurality of levels inside the basic constellation of levels, and having a constellation index negative_const, where the negative_const goes from −k−1 to −m, associated with a plurality of levels outside the basic constellation of levels.

71. The precoder according to claim 63, wherein each of the levels outside the basic constellation of levels is mapped onto only one level inside the basic constellation of levels.

72. The precoder according to claim 63, further comprising a digital to analog converter that generates an analog output signal based upon the mapped constellation signal.

73. The precoder according to claim 72, further comprising a hybrid for operably coupling the digital to analog converter to an analog subscriber loop.

74. The precoder according to claim 63 wherein a plurality of index values is associated, respectively, with a plurality of amplitude levels in the constellation of levels.

75. A precoder for generating a mapped constellation signal, from an input signal, comprising:
a feedback filter that generates a feedback signal as a function of the mapped constellation signal, and
a processing element that generates the mapped constellation signal from the input signal and the feedback signal, the processing element utilizing an index to a constellation of levels chosen for the precoder, wherein the constellation of levels includes a basic constellation of levels having successive levels separated by a distance D1 and a set of levels outside the basic constellation of levels wherein a plurality of successive levels outside the basic constellation is separated by a distance D2 such that D1 differs from D2, such that the amplitude of the mapped constellation signal is limited.

76. The precoder according to claim 75, wherein the processing element comprises:
an adder that adds together the feedback signal and the input signal to generate a partial result, and
a mapper that generates the mapped constellation signal by mapping a partial result outside the basic constellation of levels onto the basic constellation of levels as a function of the index to the constellation of levels for the precoder.

77. The precoder according to claim 76, wherein the mapper comprises:
a table identifying the basic constellation of levels and a mapping from the set of levels outside the basic constellation of levels to levels inside the basic constellation of levels.

78. The precoder according to claim 76, wherein the mapper comprises:
a table having a constellation index basic_const, where the basic_const goes from −k to k, associated with each of a plurality of levels inside the basic constellation of levels, and having a constellation index positive_const, where the positive_const goes from k+1 to m, associated with a plurality of levels outside the basic constellation of levels.

79. The precoder according to claim 78, wherein the mapper further comprises a comparator for comparing the partial result with the levels in the table.

80. The precoder according to claim 76, wherein the mapper comprises:
a table having a constellation index basic_const, where the basic_const goes from −k to k, associated with each of a plurality of levels inside the basic constellation of levels, and having a constellation index negative_const, where the negative_const goes from −k−1 to −m, associated with a plurality of levels outside the basic constellation of levels.

81. The precoder according to claim 75, wherein each of the levels outside the basic constellation of levels is mapped onto only one level inside the basic constellation of levels.

82. The precoder according to claim 75, further comprising a digital to analog converter that generates an analog output signal based upon the mapped constellation signal.

83. The precoder according to claim 82, further comprising a hybrid for operably coupling the digital to analog converter to an analog subscriber loop.

84. The precoder according to claim 75 wherein a plurality of index values is associated, respectively, with a plurality of amplitude levels in the constellation of levels.

85. An apparatus for generating a mapped constellation signal from an input signal, comprising:
a feedback filter having a delay element and a weighting element such that the feedback filter multiplies a delayed version of the mapped constellation signal by the weighting element to generate a feedback signal, and
a precoder configured to generate the mapped constellation signal from the input signal and the feedback signal, wherein the precoder utilizes a constellation of levels that include a basic constellation of levels and a set of levels outside the basic constellation of levels, and wherein the precoder is configured to associate an index with each of the levels in the constellation of levels such that the levels outside the basic constellation of levels are associated with the levels inside the basic constellation of levels.

86. The apparatus according to claim 85 wherein each of the levels outside the basic constellation of levels is only associated with one level inside the basic constellation of levels.

87. The apparatus according to claim 85 wherein the precoder includes a table that identifies the basic constellation of levels, wherein the table has a constellation index basic_const, where the basic_const goes from −k to k, associated with each of a plurality of levels inside the basic constellation of levels, and wherein the table has a constellation index negative_const, where the negative_const goes from −k−1 to −m, associated with a plurality of levels outside the basic constellation of levels.

88. The apparatus according to claim 87 wherein the precoder maps each of the plurality of levels outside the basic constellation of levels onto a level inside the basic constellation of levels according to the equation:

$$\text{index negative\_const} \rightarrow \text{negative\_const} + (2*k); \text{ while negative\_const} < -(m-k); \text{ and}$$

$$\text{index negative\_const} \rightarrow \text{negative\_const} + (2*k) + 1; \text{ while negative\_const} >= -(m-k);$$

wherein → identifies a mapping function.

89. The apparatus according to claim 85 wherein successive levels in the basic constellation of levels are separated by a distance D1, and wherein a plurality of successive levels outside the basic constellation of levels is separated by a distance D2 such that D1 differs from D2.

90. The apparatus according to claim 85 wherein a plurality of index values is associated, respectively, with a plurality of amplitude levels in the constellation of levels.

91. An apparatus for generating a mapped constellation signal from an input signal, comprising:
  a feedback filter based upon a model of an impulse response of a communication channel that generates a feedback signal, and
  a precoder configured to generate the mapped constellation signal from the input signal and the feedback signal, wherein the precoder utilizes a constellation of levels that include a basic constellation of levels and a set of levels outside the basic constellation of levels, and wherein the precoder is configured to associate an index with each of the levels in the constellation of levels such that the levels outside the basic constellation of levels are associated with the levels inside the basic constellation of levels.

92. The apparatus according to claim 91 wherein each of the levels outside the basic constellation of levels is only associated with one level inside the basic constellation of levels.

93. The apparatus according to claim 91 wherein the precoder includes a table that identifies the basic constellation of levels, wherein the table has a constellation index basic_const, where the basic_const goes from −k to k, associated with each of a plurality of levels inside the basic constellation of levels, and wherein the table has a constellation index negative_const, where the negative_const goes from −k−1 to −m, associated with a plurality of levels outside the basic constellation of levels.

94. The apparatus according to claim 91 wherein successive levels in the basic constellation of levels are separated by a distance D1, and wherein a plurality of successive levels outside the basic constellation of levels is separated by a distance D2 such that D1 differs from D2.

95. The apparatus according to claim 91 wherein a plurality of index values is associated, respectively, with a plurality of amplitude levels in the constellation of levels.

96. An apparatus for generating a mapped constellation signal from an input signal, comprising:
  a precoder configured to generate the mapped constellation signal from the input signal and a feedback signal, wherein the precoder utilizes a constellation of levels that include a basic constellation of levels and a set of levels outside the basic constellation of levels, and wherein the precoder is configured to associate an index with each of the levels in the constellation of levels such that the levels outside the basic constellation of levels are associated with the levels inside the basic constellation of levels, and wherein the precoder employs an adder that adds together the feedback signal and the input signal to generate a partial result and a mapper that generates the mapped constellation signal by mapping a partial result outside the basic constellation of levels onto the basic constellation of levels as a function of the index to the constellation of levels, the mapper having a table to identify the basic constellation of levels and associate levels outside the basic constellation of levels to levels inside the basic constellation of levels.

97. The apparatus according to claim 96 wherein each of the levels outside the basic constellation of levels is only associated with one level inside the basic constellation of levels.

98. The apparatus according to claim 96 wherein the precoder includes a table that identifies the basic constellation of levels, wherein the table has a constellation index basic_const, where the basic_const goes from −k to k, associated with each of a plurality of levels inside the basic constellation of levels, and wherein the table has a constellation index negative_const, where the negative_const goes from −k−1 to −m, associated with a plurality of levels outside the basic constellation of levels.

99. The apparatus according to claim 96 wherein successive levels in the basic constellation of levels are separated by a distance D1, and wherein a plurality of successive levels outside the basic constellation of levels is separated by a distance D2 such that D1 differs from D2.

100. The apparatus according to claim 96 wherein a plurality of index values is associated, respectively, with a plurality of amplitude levels in the constellation of levels.

101. An apparatus for generating a mapped constellation signal from an input signal, comprising:
  a precoder configured to generate the mapped constellation signal from the input signal and a feedback signal, wherein the precoder utilizes a constellation of levels that include a basic constellation of levels and a set of levels outside the basic constellation of levels, and wherein the precoder is configured to associate an index with each of the levels in the constellation of levels such that the levels outside the basic constellation of levels are associated with the levels inside the basic constellation of levels and the precoder employs a table that identifies the basic constellation of levels, the table having a constellation index basic_const, where the basic_const goes from −k to k, associated with each of a plurality of levels inside the basic constellation of levels, and the table having a constellation index positive_const, where the positive_const goes from k+1 to m, associated with a plurality of levels outside the basic constellation of levels, wherein said k is a constant and said m is a multiple of said k.

102. The apparatus according to claim 101 wherein each of the levels outside the basic constellation of levels is only associated with one level inside the basic constellation of levels.

103. The apparatus according to claim 101 wherein the precoder maps each of the plurality of levels outside the basic constellation of levels onto a level inside the basic constellation of levels according to the equation:

$$\text{index positive\_const} \rightarrow \text{positive\_const} - (2*k); \text{ while positive\_const} > m-k; \text{ and}$$

$$\text{index positive\_const} \rightarrow \text{positive\_const} - (2*k) - 1; \text{ while positive\_const} <= m-k;$$

wherein → identifies a mapping function.

104. The apparatus according to claim 101 wherein the table that identifies the basic constellation of levels, wherein the table has the constellation index basic_const, where the basic_const goes from −k to k, associated with each of the plurality of levels inside the basic constellation of levels, and wherein the table has a constellation index negative_const, where the negative_const goes from −k−1 to −m, associated with a plurality of levels outside the basic constellation of levels.

105. The apparatus according to claim 104 wherein the precoder maps each of the plurality of levels outside the basic constellation of levels onto a level inside the basic constellation of levels according to the equation:

index negative_const→negative_const+(2*k); while negative_const<−(m−k); and index negative_const→negative_const+(2*k)+1; while negative_const>=−(m−k);

wherein→identifies a mapping function.

106. The apparatus according to claim 104 wherein the precoder further comprises a comparator for comparing a partial result with the levels in the table.

107. The apparatus according to claim 106 wherein the comparator identifies the level closest to the partial result.

108. The apparatus according to claim 107 wherein the precoder further includes an output block that generates the mapped constellation signal equal to a level inside the basic constellation of levels, if the identified level in the table closest to the partial result is inside the basic constellation of levels.

109. The apparatus according to claim 107, wherein the mapped constellation signal is set equal to the sum of the partial result and a mapping distance signal, wherein the mapping distance signal equals the distance between the index basic_const, associated with a basic constellation level of the input signal, and the index positive_const, associated with a level outside the basic constellation of levels.

110. The apparatus according to claim 101 wherein successive levels in the basic constellation of levels are separated by a distance D1, and wherein a plurality of successive levels outside the basic constellation of levels is separated by a distance D2 such that D1 differs from D2.

* * * * *